Figure 10:
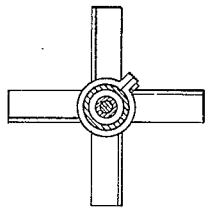

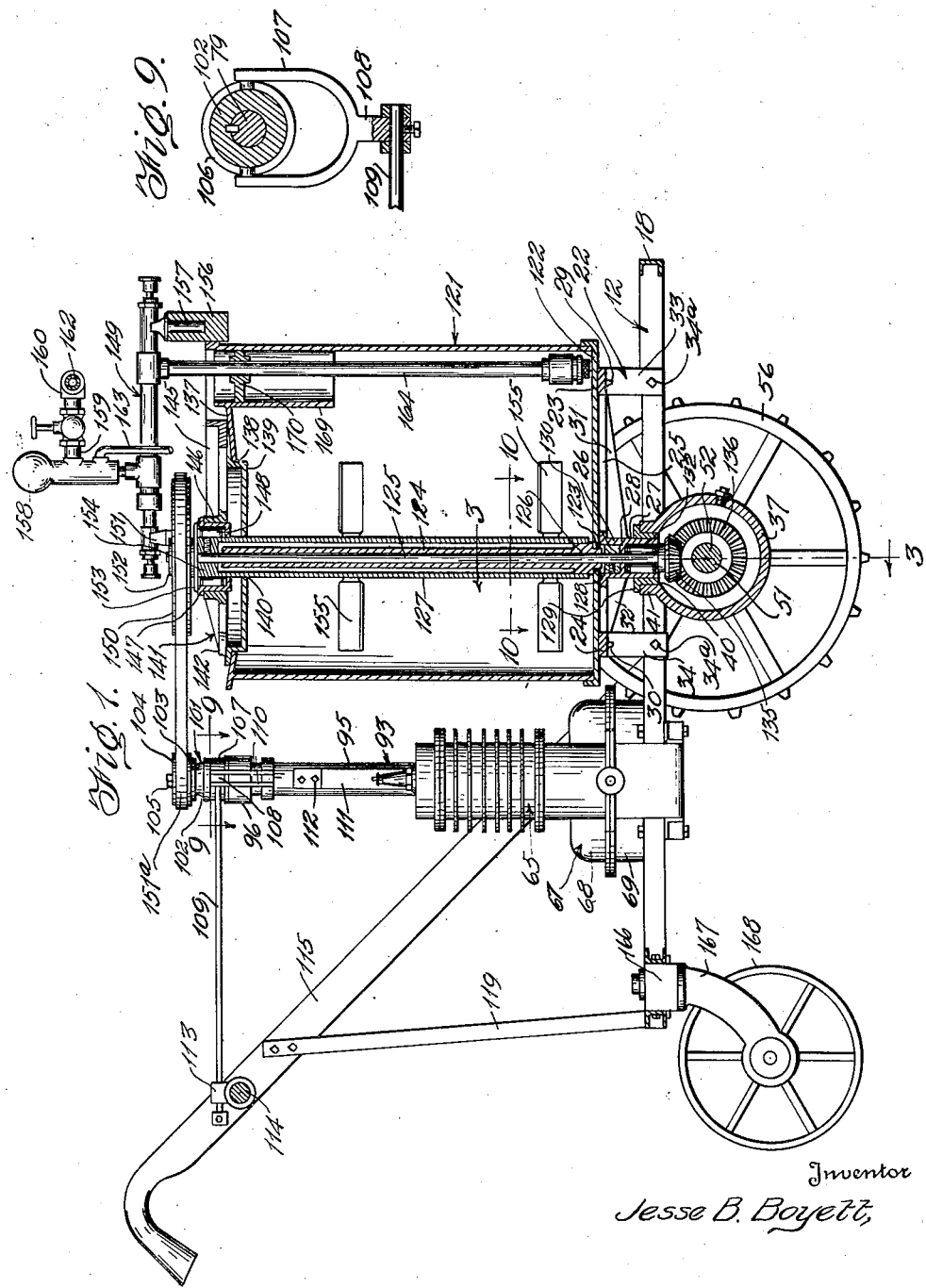

Aug. 24, 1937.  J. B. BOYETT  2,090,929
SELF PROPELLED SPRAYING MACHINE
Filed Dec. 28, 1936  4 Sheets-Sheet 2

Inventor
Jesse B. Boyett,

By Kimmel & Crowell
Attorneys

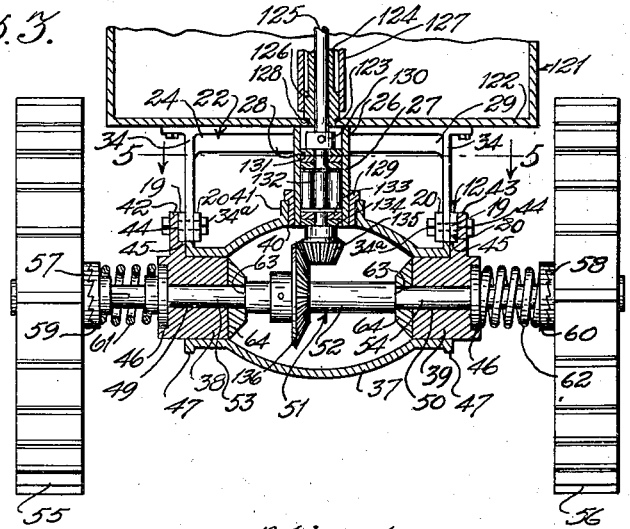
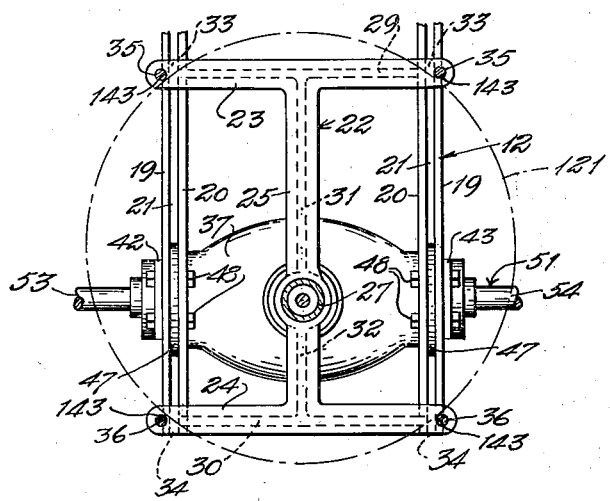

Aug. 24, 1937.    J. B. BOYETT    2,090,929
SELF PROPELLED SPRAYING MACHINE
Filed Dec. 28, 1936    4 Sheets-Sheet 4
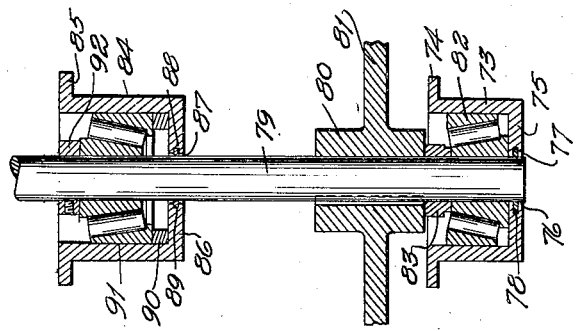
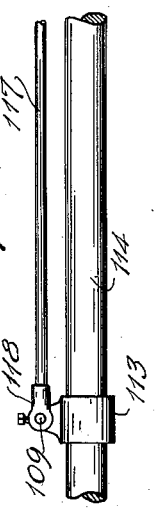
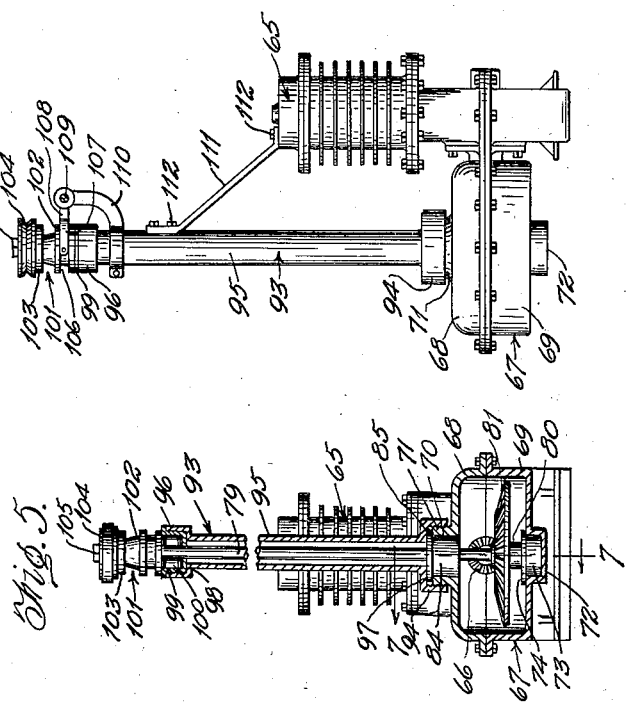
Inventor
Jesse B. Boyett
By Kimmel & Crowell
Attorneys Patented Aug. 24, 1937

2,090,929

UNITED STATES PATENT OFFICE 2,090,929

SELF-PROPELLED MACHINE

Jesse B. Boyett, Nashville, Ga.

Application December 28, 1936, Serial No. 118,004

15 Claims. (Cl. 299—46)

This invention relates to a mobile spraying machine designed primarily for use for the spraying of plants with any suitable solution for relieving plants of diseases and noxious insects and the like, but it is to be understood that the machine may be employed in any connection for which it is found applicable.

The invention is an improvement upon the machine forming the subject of Letters Patent 2,022,584 granted to me November 26, 1935. The invention not only embodies the objects and advantages set forth by the patent aforesaid, but has for a further object to provide, in a manner as hereinafter set forth a spraying machine of the self propelled type.

A further object of the invention is to provide, in a manner as hereinafter set forth, a spraying machine carrying means for operating a transmission to drive an operating structure common to an agitator, an oscillatory pump and a transmission for a rotatable axle carrying a pair of traction wheels mounted for differential drive.

A further object of the invention is to provide, in a manner as hereinafter set forth, a machine for the purpose referred to including a valve controlled spraying solution discharge pipe common to a plurality of solution conducting lines leading to spray elements.

A further object of the invention is to provide, in a manner as hereinafter set forth, a machine for the purpose referred to including a horizontally revoluble structure common to and providing for the oscillating of an oscillatory pump, the revolving of an agitating means and the operation of a transmission for propelling the machine.

A further object of the invention is to provide, in a manner as hereinafter set forth, a machine of the class referred to including a horizontally revoluble operating structure for and common to a pump, an agitator and a transmission to provide for the self propelling of the vehicle, a driving means for said structure and means for controlling the operation of said structure from the driving means.

Further objects of the invention are to provide, in a manner as hereinafter set forth, a self propelled automatically acting spraying machine which is simple in its construction and arrangement of parts, strong, durable, compact, controllable, thoroughly efficient in its use, readily assembled and comparatively inexpensive to manufacture.

With the foregoing and other objects in view, the invention consists of the novel construction, combination and arrangement of parts as will be more specifically referred to and are as illustrated in the accompanying drawings, wherein is shown an embodiment of the invention but it is to be understood that changes, variations and modifications may be resorted to which fall within the scope of the invention as claimed.

Figure 11:
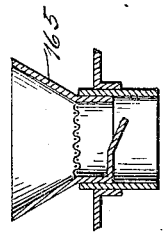
Figure 2:
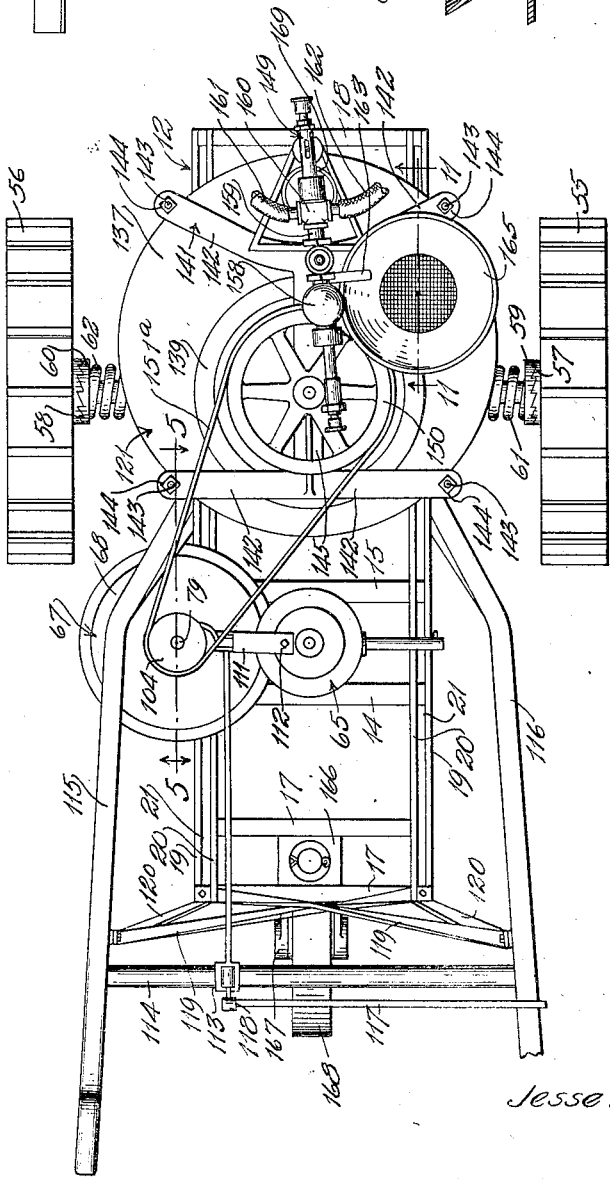

In the drawings:

Figure 1 is a side view partly in elevation and partly in vertical section of the machine, Figure 2 is a plan of the machine, Figure 3 is a fragmentary sectional view on line 3—3, Figure 1, Figure 4 is a detail section on line 4—4, Figure 3, Figure 5 is a fragmentary view in section on line 5—5, Figure 2, Figure 6 is a fragmentary view in rear elevation of the motor and driving mechanism for the upper transmission, Figure 7 is an enlarged sectional detail on line 7—7, Figure 5, Figure 8 is a fragmentary detail in rear elevation of a clutch shaft, Figure 9 is a fragmentary view in plan and upon an enlarged scale on line 9—9, Figure 1, Figure 10 is a detail in section on line 10—10, Figure 1, and Figure 11 is a fragmentary view in section on line 11—11, Figure 2.

The apparatus includes a body part in the form of a flatwise disposed rectangular frame 12 including a pair of spaced parallel combined bracing and supporting members 14, 15 arranged between the transverse median and rear end of body part 12. The members 14, 15 are arranged at the lower face of the body part. The body part also includes a transverse brace member 16 positioned in proximity to the rear end 17 thereof. The front of body part 12 is indicated at 18. The member 16 is in the form of a channel iron. The ends 17, 18 are in the form of channel irons. The channel iron 16 is oppositely disposed with respect to the channel iron 17. Each side of body part 12 is formed of outer and inner flat bars 19, 20 respectively disposed on a lengthwise edge and maintained in spaced relation by suitable spacing means at the forward and rear ends of the said bars. The bars of each side provide a space therebetween, indicated at 21.

The machine includes a supporting frame 22 arranged forwardly of member 15 and carried by and extending upwardly from body part 12. The frame 22 includes an I-shaped top disposed horizontally and formed of a pair of spaced parallel end members 23, 24 and a central member 25 merging at its ends into the members 23, 24 centrally of these latter. The member 25 between its transverse median and the member 24 is formed with an enlarged annular part 26 having formed integral therewith a depending sleeve 27 provided intermediate its ends with an axially apertured web 28 (Figure 1). The lower face of member 23 has a de-reinforcing web 29 extending lengthwise thereof and terminating adjacent its ends. The member 24 has depending from its lower face a reinforcing web 30 extending lengthwise thereof and terminating adjacent each of its ends. The member 25 has depending from its lower face a pair of reinforcing webs 31, 32. The web 31 merges into the web 29 and one side of the sleeve 27. The web 32 merges into the opposite side of sleeve 27 and into the web 30. The member 23 adjacent each of its ends is provided with a pair of depending arms 33, only one of which is shown. The arms 33 are arranged in parallel spaced relation. The member 24 adjacent each of its ends is formed with a pair of depending arms 34 arranged in parallel spaced relation. The web 29 merges into the inner sides of the arms 33. The web 30 merges into the inner sides of the arms 34. The side faces of the arms 33, 34 are disposed at right angles to the lengthwise edges of the members 23, 24. The arms 33, 34 are termed supports and extend between the bars 19, 20 of the sides of the body part 12 and are anchored therewith by the holdfast means 34ª. The arms 33, 34 are provided for suspending a horizontally disposed housing 37 and a pair of bearings 38, 39. The ends of the housing 37 are open. The bearings 38, 39 are oppositely disposed and extend into the housing 37 from the open ends of the latter. The top of housing 37 is formed centrally with an opening 40 and an upstanding collar 41 having its inner face flush with the wall of opening 40.

The bearings 38, 39 are provided at their tops and in proximity to their outer ends with upstanding apertured oppositely disposed lugs 42, 43 respectively rabbeted on their inner faces as at 44 to provide the shoulders 45. The bearings 38, 39 project outwardly from the ends of housing 37 and are recessed in their outer ends as at 46. The base of the inner faces of the lugs 42, 43 abut against the end edges of the housing 37. The latter at each end thereof is formed with outwardly directed endless flange 47 which is flush with the shoulders 45. The lugs 42, 43 are termed hangers and the shoulders 45 thereof abut the bottom edges of the bars 19 of the sides of body part 12. The lugs 42, 43 are secured to the bars 19, 20 of the sides of the body part 12 by the holdfast means 48. The bearings 38, 39 are tubular and the openings provided thereby are indicated at 49, 50 respectively.

Extending through the bearings 38, 39 and the housing 37 is a driven rotatable axle 51 having an enlarged central portion 52 and reduced end portions 53, 54 upon which are loosely retained the traction wheels 55, 56 respectively formed on their inner faces and axially thereof with the clutching members 57, 58 respectively. The clutching members 57, 58 are oppositely disposed and coacting therewith is a pair of oppositely spring pressed clutching members 59, 60 which are slidably keyed on the reduced portions 53, 54 of the axle 51. The controlling springs for the clutching members 59, 60 are indicated at 61, 62 and are interposed between the recesses 46 and the clutching members 59, 60 respectively. The manner of mounting the traction wheels 55, 56 upon the axle 51 provides for a differential action. The members 59, 60, when the machine is being propelled forwardly or rearwardly on a straight line of draft will couple the wheels 55, 56 with axle 51 whereby said wheels are revolved with the turning of the axle 51. In case of turning, when the machine is being propelled, one wheel will be clutched and driven from the axle 51 and the other wheel will revolve loosely on the axle thereby providing a differential action. At the junction of the reduced portions 53, 54 with the enlarged portion 52 of axle 51, shoulders 63 are formed and interposed between the said shoulders 63 and the inner ends of the bearings are oppositely disposed beveled stop collars 64.

Rearwardly of the member 23 of the frame 22 and connected to and supported upon the members 14, 15 is a vertically disposed motor or engine 65 of the internal combustion reciprocating type having its crank shaft supporting in lateral relation a beveled pinion 66 arranged within a housing 67 positioned to one side of the lower portion of the motor 65 and supported upon the members 14, 15 as well as extended laterally from one of the sides of the body portion 18. The housing includes an upper and a lower section indicated at 68, 69 respectively. The section 68 is centrally apertured as at 70 and formed with an upstanding collar 71 which is externally threaded and has its inner face flush with the wall or opening 70. The bottom of section 69 centrally thereof is formed with a depending pocket 72. Arranged within the pocket 72 is a cup 73 having its upper end provided with an annular flange 74 which seats upon the upper face of the bottom of the section 69 of housing 67. The bottom 75 (Figure 7) of cup 73 has an axial opening 76. The wall of opening 76 is grooved as at 77 and mounted therein is a packing 78 for the lower end of a vertically disposed transmission shaft 79 which has splined therewith the hub 80 of a horizontally disposed crown gear 81 of the beveled type and which is engaged by and driven from the pinion 66. Arranged within the cup 73 is a roller bearing structure 82 of the cone type for the lower portion of the shaft 79. A spacer ring 83 is mounted on shaft 79 between hub 80 and the bearing structure 82.

Arranged within and supported from the edge of collar 71 is a cup 84 formed at its upper end with a laterally directed flange 85 which seats upon the top edge of collar 71. The bottom 86 of cup 84 is formed with an axial opening 87 for the passage of shaft 79. The wall of opening 87 is grooved as at 88 and in said groove is mounted a packing 89 for the shaft 79. Mounted in the cup 84 and supported upon an annulus 90 is a roller bearing structure 91 of the cone type and which is oppositely disposed with respect to the bearing structure 82 mounted in cup 73. Carried by the shaft 79 is a spacer ring 92 positioned in the cup 84 and arranged over the bearing structure 91.

Extending upwardly from and connected to the top section 68 of the housing 67 is a tubular column 93 having a lower portion 94 of enlarged diameter with respect to its intermediate portion 95. The upper portion of column 93, indicated at 96 is of enlarged diameter with respect to the intermediate portion 95. The junction of the portion 94 with the lower portion of the portion 95 of the column 93 provides an annulus shoulder 97 which is seated on the flange 74 of the cup 73. The portion 94 is formed with internal threads which engage with the threads of the collar 71 whereby column 93 and housing 67 are secured together and with the column supported from the cup 73. The junction of the portion 95 with the portion 96 of column 93 provides the latter with a shoulder 98. Mounted in and supported by the portion 96 of column 93 is a flanged cup 99 carrying a roller bearing structure 100. The shaft 79 extends through column 93, through bearing structure 100 and beyond the upper end of portion 96 of column 93.

Mounted on that portion of the shaft 79 which extends above portion 96 of column 93 is a clutching means 101 formed of a lower section 102 and an upper section 103. The section 102 is slidably connected to the shaft 79. The section 103 is loosely mounted on shaft 79 and is adapted to be coupled by section 102 to shaft 79 to provide for sections 102, 103 rotating in unison. The clutching means 101 may be of any suitable form but the form illustrated is of the frictional type. Fixed to the section 103 is a grooved pulley 104 which is loosely mounted on shaft 79 and is connected to the latter so as to rotate therewith when the clutching means is active. The section 102 of the clutching means is adapted to frictionally engage with the inner face of the clutching section 103 when the clutching means is in active position. The pulley 104 is held on shaft 79 by any suitable means as indicated at 105. Clutching section 102 is formed intermediate its ends with a peripheral annular groove 106 and slidably mounted in the groove 106 is a shifting yoke 107 for the section 102. The yoke 107 is provided at its base with a stem 108 to which is connected one end of a rock shaft 109. That end of the rock shaft 109 which is connected to the stem 108 is mounted in an upstanding pair of brackets 110 which is fixedly secured to the column 93. The latter is braced and secured with the upper end of the motor 65 by an inclined brace member 111 anchored to column 93 and motor 65 by the holdfast device 112. The shaft 109 extends rearwardly and is mounted in a bearing 113 carried by a combined bracing and coupling bar 114 which is arranged between the upper portion of a pair of upwardly extending spaced handle bars 115, 116. The handle bars are anchored to the sides of the body part 12. The shaft 109 is rocked by a handle member 117 connected to the rear end of the shaft 109 as at 118. The handle member 117 is normally supported upon the handle bar 116 (Figure 2). Bracing means, indicated at 119, 120 (Figure 2) are provided for the handle bars 115, 116. The bracing means 119 are secured at their upper ends to the bars 115, 116 and at their lower ends to the rear of the body part 12. Bracing means 120 are secured in the same manner as the bracing means 119.

Mounted upon the supporting frame 22 is a vertically disposed tank 121 for the spraying solution. The bottom 122 of tank 121 is formed eccentrically thereof with an opening 123. Arranged within the tank 121 is a vertically disposed tubular member 124 constituting a bearing for a vertically disposed transmission shaft 125. The member 124 in proximity to its lower end is enlarged as at 126 to provide a spacing means for a tubular shaft 127. The enlarged portion 126 of shaft 125 forms a shoulder 128 which seats on the bottom 122 of tank 121. The lower end of member 124 extends downwardly through the opening 123 into the sleeve 27. The shaft 125 extends through the member 124, sleeve 27, web 28 and into the housing 37.

Mounted on the collar 41 and extending therein, as well as encompassing the sleeve 27 is a flanged bushing 129 (Figure 3). The shaft 125 carries a stop collar 130 arranged within the sleeve 127. A dust washer 131 is positioned in sleeve 27. A roller bearing structure 132 is arranged within sleeve 27. The shaft 125 depends from the bearing structure 132. Arranged within sleeve 27 is a dust washer 133. The lower end of sleeve 27 is closed by an axially apertured plate 134. That end of the shaft 125 which extends into the housing 37 is provided with a beveled pinion 135 which meshes with a beveled gear 136 carried by the axle 51. On the operation of the shaft 125 the axle 51 will be operated and traction imparted to the machine. The means for operating the shaft 125 will be presently referred to.

The tank 121 includes a top 137 formed with an opening 138 closed by a flanged cap piece 139 provided with an axial opening 140. The shaft 127 extends downwardly through the opening 140. The shaft 125 is of greater length than and extends above the upper end of shaft 127. The latter terminates above the bottom 122 of tank 121 and revolves about the portion 126 of the member 124.

Mounted upon the top 137 of tank 121 is a substantially I-shaped top frame 141 having its end arms or members 142 projecting laterally from the top 137. The arms 142 are apertured in proximity to their ends. Extending through the apertures 35, 36 of the members 23, 24 are upstanding tie rods 143 which pass through the openings of the arms 142 and carry on their upper ends clamping nuts 144. The members 23, 24, arms 142, tie rods 143 and nuts 144 are provided for clamping the tank 121 to the supporting frame 22, the latter being anchored to the body part 12.

The central arm 145 of the top frame 141 is formed with an annular portion 146 in which is suspended a flanged cup 147 carrying a bearing structure 148.

The machine includes an operating structure which is common to an oscillatory pump 149 and the shafts 125 and 127. Said operating structure includes a pulley wheel 150 of greater diameter than pulley 104 which carries eccentrically thereof an upstanding pin 151. The pulley 150 is driven from the pulley 104 by the endless belt 151a constituting an upper transmission. The hub 152 of pulley 150 carries a disc 153 which is revolubly mounted on the cup 147. Integral with the disc 153 is a depending annular stub shaft surrounded by the bearing structure 148. Stub shaft 154 is integral with the upper end of shaft 127. The upper end of shaft 125 extends into stub shaft 154 and is fixedly secured thereto. The cup 147 has an opening for the downward passage of the shaft 127. The latter forms the shaft of an agitating means for the solution. The agitating means is arranged in tank 121 and not only includes the shaft 127 but also superposed sets of agitating blades 155 carried by shaft 127. One set of blades is arranged in proximity to the bottom of tank 121.

Secured to the upper end of the body of tank 121 is a socket forming member 156 carrying a pin 157 which is connected to the pump 149. The pins 151 and 157 correspond to the elements 147 and 154 of the patent aforesaid. The pump 149 is a reciprocatory oscillatory pump of the same form and construction as shown in the patent aforesaid. It is thought unnecessary to specifically describe and show the construction of the pump 149 because it is mounted and constructed similar to the pump as disclosed by the patent aforesaid. The air chamber forming element 158 of pump 149 and which corresponds to the element 102 disclosed by the patent aforesaid is not provided with a pair of openings for oppositely extending spraying solution conducting lines as element 120 of said patent, but in lieu thereof the chamber 158 is provided with a single opening having a valve controlled solution conducting-off pipe 159 which opens into a T-coupler 160 to which the oppositely extending solution conducting lines 161, 162 are attached. The chamber 158 has extending therefrom a solution return means 163 which is for the same purpose and is of the same construction as the solution return means disclosed by the patent aforesaid.

The pump 149 includes a valve controlled suction pipe structure 164 which is of the same form and arrangement as the suction pipe construction disclosed by the patent aforesaid.

The top 137 of the tank 121 is provided with a filling opening structure 165 of the same form and arrangement as the filling opening structure disclosed by Figure 8 of the patent aforesaid.

Secured between the brace member 16 and the rear end 17 of the body part 12 is a bearing block 166 to which is swivelly connected the upper end of a hanger 167 carrying a rear supporting wheel 168 of less diameter than the traction wheels. The block 166 is disposed on the longitudinal median of the body part 12.

The top 137 and the body of tank 121 have formed integral therewith means 169 to provide a sleeve through which the suction pipe structure 164 extends and arranged within said means is a resilient apertured member 170 through which the suction pipe extends. The means 169 and member 170 are for the same purpose and are of the same construction as the elements 95 and 95ᵃ of the patent aforesaid.

The pump 149 is oscillated and reciprocated from the pulley 150, the oscillatory movement being simultaneously with the reciprocatory movement. The operation of the pump is had simultaneously with the travel of the vehicle. The operation of the pump is also had simultaneously with the operation of the shaft 127. The propelling of the vehicle and the simultaneous operation therewith of the agitating means and the pump is controlled by the clutch 101.

The pump 149 functions in the same manner as the pump structure 99 disposed by the patent aforesaid.

What I claim is:

1. In a self-propelled spraying machine, a body part, a motor on the latter, a rear supporting wheel for said body part, a driven traction structure suspended from said body part, a vertically disposed front transmission shaft, the lower end of said shaft and said structure between its sides having coacting interengaging means for propelling said structure on the operation of said shaft, driving means for and fixed to the upper end of said shaft, a vertically disposed rear transmission shaft located adjacent to the motor, a driving connection for the rear shaft leading from the motor to the lower end of such shaft, and a controllable transmission means between the upper end of the rear shaft and the driving means for the front shaft.

2. In a spraying machine of that type including a body part and a solution-carrying tank clamped upon said body part, the combination of a motor mounted on the body part, a driven traction structure suspended from the body part below the tank and including wheels and means coacting with the wheels to provide a differential action for said structure, an upstanding front transmission means extending through the tank and body part, the lower end of said transmission means and said structure between the wheels thereof having coacting interengaging parts for propelling said structure on the operation of said means, an upstanding rear transmission means on said body part located adjacent the motor, a driving connection for the rear transmission leading from the motor to the lower end of such transmission, and a controllable transmission means for said front transmission means arranged at the upper ends of the said front and rear transmission means and driven from the latter.

3. In a spraying machine, a rectangular skeleton body part, a supporting frame secured to the sides of and extended upwardly from said body part, a spraying solution-carrying tank mounted on and clamped to said frame, a driven rotatable axle suspended from said body part, a pair of traction wheels loosely mounted on said axle and each having its inner side provided with a clutching member encompassing the axle, a pair of oppositely disposed spring controlled clutching members slidably mounted on the axle and coacting with the clutching members on said wheels for normally clutching the wheels to said axle, a vertically disposed rotatable element extending through, sealed to, extending above and depending from said tank, the lower end of said element and said axle intermediate its ends having coacting interengaging means for rotating the axle on the rotation of said element, a motor on said body part adjacent said frame, and upstanding means driven from the motor and connected to the upper end of said element for rotating the latter.

4. In a spraying machine, a spraying solution-carrying tank, an upstanding agitating means depending into said tank, an upstanding front transmission shaft extending through said agitating means and tank, a horizontally disposed oscillatory-reciprocatory pump arranged over and communicating with the tank for discharging the solution from the latter, a horizontally revoluble driving structure common to said means, shaft and pump secured to the upper end of said means and shaft and connected with the inner end of the pump, an upstanding rear transmission shaft adjacent the tank, a controllable driving connection between the upper end of said rear shaft and said structure, a motor adjacent said tank and operatively connected with the lower end of said rear shaft for driving it, supporting means common to the tank, motor, and rear shaft, and mobile means suspended from said supporting means and driven from the lower end of said front shaft for propelling the machine simultaneously with the operation of the said agitating means, shafts and pump.

5. In a self-propelled self-operated spraying machine, a body part, a solution-carrying tank on said body part, a motor on said body part adjacent the tank, a driven solution agitating means within said tank, a driven shaft extending through said means, a driven pump for discharging the solution from the tank, a driven traction structure suspended from said body part, a driving structure common to said means, pump and shaft structure, said shaft having its lower end provided with a driving connection for said structure, and a controllable upstanding operative drive connection for and connected at its upper end to said driving structure, the said upstanding operative drive connection being operated at its lower end from said motor.

6. In a self-propelled self-operated spraying machine, a body part, a driven traction structure therefor, an upstanding housing means on said body part, a motor adjacent to means, an upstanding rear shaft operated from the motor and encompassed by and extended from the upper end of said means, superposed bearings structure for said shaft supported by said means, a spraying solution-carrying tank on said body part, agitating means extending into said tank, an upstanding front shaft extending through said agitating means and operatively connected to said traction structure for driving the latter, a pump communicating with said tank for discharging the solution, a driving structure common to said agitating means, front shaft and pump, and a controllable transmission connected to the upper end of the rear shaft and leading to said driving structure, the latter being arranged at the upper end of said agitating means and front shaft and below an end of the pump.

7. In a self-propelled self-operated spraying machine, a body part, a motor supported thereby, a controllable transmission mechanism operated from the motor, supported by and extending upwardly from said body part, a driven traction structure depending from said bodypart, a solution-carrying tank on said body part adjacent the motor, a pump communicable with the tank for discharging the solution, an agitating means extending into the tank, and a driving mechanism common to said agitating means, pump and traction structure, said driving mechanism being operatively connected to and operated from the upper end of said transmission mechanism, said driving mechanism being arranged over the tank and including a rotatable part extending through the means to the traction structure.

8. In a self-propelled self-operated spraying machine, a body part, a motor supported thereby, a controllable transmission mechanism operated from the motor, supported by and extending upwardly from said body part, a driven traction structure depending from said bodypart, a solution-carrying tank on said body part adjacent the motor, a pump communicable with the tank for discharging the solution, an agitating means extending into the tank, a driving mechanism common to said agitating means, pump and traction structure, said driving mechanism being operatively connected to and operated from the upper end of said transmission mechanism, said driving mechanism being arranged over the tank and including a rotatable part extending through the means to the traction structure, a return pipe leading from the pump to the tank, a valve-controlled fluid outlet pipe connected to the pump, and a coupling attached to said pipe for connecting with the latter solution conducting lines.

9. In a self-propelled spraying machine of that type including an operable spraying structure, a propelling means for the machine and an operating means common to said structure and propelling means, the combination of a motor, a housing adjacent the motor, a tubular column fixed at the lower end to the housing, a vertically disposed driven shaft arranged within, extended upwardly from and depending from the column into said housing, bracing means for said column extended from the motor, driving means for said shaft within the housing, an operative drive connection for said driving means operated from the motor, and a controllable power transmission leading from the upper end of the shaft to the said common operating means.

10. In a self-propelled spraying machine of that type including an operable spraying structure, a propelling means for the machine and an operating means common to said structure and propelling means, the combination of a motor, a housing adjacent the motor, a tubular column fixed at the lower end to the housing, a vertically disposed driven shaft arranged within, extended upwardly from and depending from the column into said housing, bracing means for said column extended from the motor, driving means for said shaft within the housing, an operative drive connection for said driving means operated from the motor, a controllable power transmission leading from the upper end of the shaft to the said common operating means, and superposed bearing structures for said shaft.

11. In a self-propelled spraying machine, an operable spraying solution structure, a propelling means for the machine, an operating means common to said structure and propelling means, said common operating means consisting of a pulley interposed in said structure in proximity to its top, said common operating means being connected with said structure and propelling means, a motor fixed to the machine, an upstanding drive mechanism driven from and having its lower portion connected with the motor, a controllable power transmitting means leading from the upper end of said mechanism to said common operating means for driving the latter, and a controlling means for the power transmitting means.

12. In a self-propelled spraying machine, an operable spraying solution structure, a propelling means for the machine, an operating means common to said structure and propelling means, said common operating means consisting of a pulley interposed in said structure in proximity to its top, said common operating means being connected with said structure and propelling means, a motor fixed to the machine, an upstanding drive mechanism driven from and having its lower portion connected with the motor, a controllable power transmitting means leading from the upper end of said mechanism to said common operating means for driving the latter, a controlling means for the power transmitting means, and a bracing means for said power transmitting means extended from said motor.

13. In a self-propelled spraying machine, a body part, a mobile structure suspended from said body part, upstanding supporting means on said body part, a vertically disposed spraying solution tank, means for clamping the tank on said means, an agitating means within the tank, a front shaft extending through said agitating means, tank and supporting means, a pump over and communicating with the tank, a pulley constituting a common operating means for the pump, shaft and agitating means, said operating means being connected to the pump and suspending said agitating means and shaft, said structure and shaft having coacting interengaging parts for propelling said structure on the operation of said shaft, a motor on said body part, an upstanding drive mechanism driven from and having its lower portion connected with said motor, a controllable power transmitting means leading from the upper end of said mechanism to said common operating means, and a controlling means for said power transmitting means.

14. In a spraying machine of that type including a propelling means and an operable spraying structure, the combination of a pulley constituting a common operating means for said structure and propelling means, a vertically disposed driven shaft, a motor, a driving connection leading from the motor for said shaft, superposed bearing structures for said shaft, a controllable driving connection for said common operating means leading to the latter from the upper end of said shaft, and a controlling means for said controllable driving connection.

15. In a self-propelled, self operated spraying machine, a body part, a normally inactive mobile structure suspended from said body part, an operable spraying structure on said body part including a tank for the spraying solution, a pump communicating with the tank and an agitator within the tank, rotatable means extending through said agitator and engaging with said mobile structure for propelling it when rotated, a driven pulley suspending said agitator and rotatable means and connected to the pump and constituting a common driving means for the agitator, pump and rotatable means, a motor, an upstanding structure including a vertically disposed rotatable shaft driven from the motor, a controllable power transmission on the upper end of the shaft and leading from the latter to the pulley for driving the latter, and a controlling means for said controllable transmission.

JESSE B. BOYETT.